Dec. 20, 1960 G. G. SIEMSSEN ET AL 2,964,750
FLEXIBLE STRIPS OF FIXING ELEMENTS
Filed Feb. 10, 1958
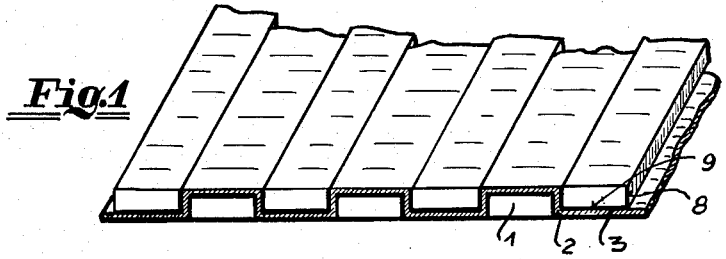
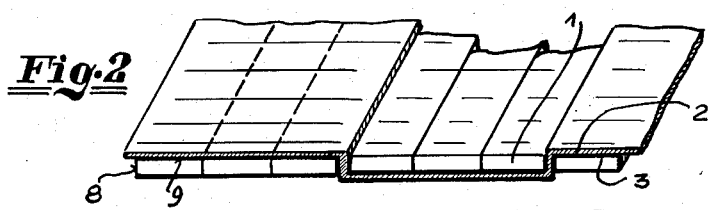
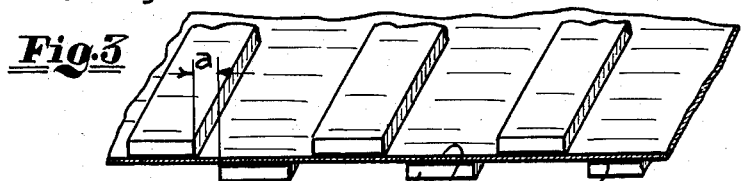
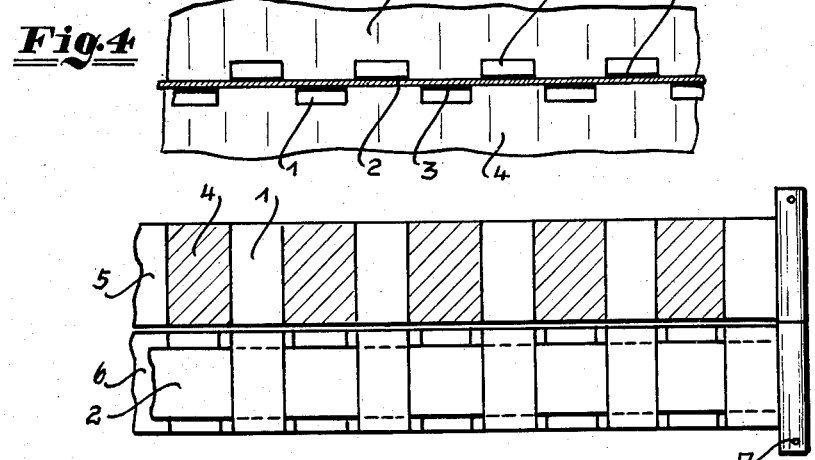

United States Patent Office 2,964,750
Patented Dec. 20, 1960

2,964,750

FLEXIBLE STRIPS OF FIXING ELEMENTS

Georg Gustav Siemssen and Rüdolf Post, Frankfurt am Main, Germany, assignors to Elastic A.G. vormals M. Vogel A.G., Frankfurt am Main, Germany, a German company Filed Feb. 10, 1958, Ser. No. 714,439

Claims priority, application Germany Feb. 9, 1957

5 Claims. (Cl. 1—56)

This invention relates to flexible strips of fastening elements.

It is known to use adhesive bands or foils and to arrange staples or nails in rows on one side of a band to form strips for use in stapling machines. The disadvantage of using these adhesive bands or foils in this manner is that, since the row of staples or nails is on one side of the band only, the strip can only bend in one direction even if the band is stretchable and a strong material is used. Therefore, a strip of this kind can only be wound in one direction, and cannot be disposed, for example, in a rectangular zig-zag form which affords great advantages as regards utilization of space.

According to the present invention, there is provided a flexible strip of staples or the like which are connected together by a foil with the addition of an adhesive, wherein the staples are surrounded on more than one side individually or in groups. More particularly, groups of one or more elements are attached to opposite sides of the band.

With the structure of the invention, it is also possible to stretch out the whole band subsequently by pulling, so that the individual elements are spaced at substantial intervals from one another in which intervals, for example, toothed wheels can engage for a reliable feed.

Advantageously, the invention employs a minimum of band material to provide a maximum of spacing between the elements on the stretch band. Moreover, manufacturing difficulties are minimized.

For a better understanding of the invention and to show how the same may be carried into effect reference will next be made to the accompanying drawings, in which:

Fig. 1 shows a number of elements connected by a foil,

Fig. 2 shows an alternative arrangement of the elements on a foil,

Fig. 3 shows the arrangement of Fig. 1, the band having been pulled taut,

Fig. 4 is a front view of a manufacturing device, and

Fig. 5 is a sectional plan view of the device of Fig. 4.

In Figure 1, adjacently disposed staple or nail elements 1 are so connected together by a foil 2 and by an adhesive 3 that the elements 1 are each surrounded on three sides by the foil 2.

In Figure 2, each group of three adjacent elements 1 are fixed on one side of the foil 2 to form a unit and the next adjacent three elements 1 are fixed on the other side to form a further unit.

Figure 3 shows the arrangement of Figure 1, but the vertical surfaces 8 of the elements 1 which contacted the foil 2 have been detached by pulling the foil 2 taut, so that the elements 1 lie slightly apart with their top or bottom surfaces 9 on the foil and a distance $a$ between adjacent elements 1, thus forming a kind of toothed system.

Figure 4 shows the end faces of the nails or staples 1 as they are pushed out of holes in the manufacturing device 4. The device 4 has two rows of holes, one slightly above the other, the rows being staggered in order that the planar foil 2 can be taken between the two rows of elements. The part 6 (Fig. 5) of the device 4 is movable for a shearing action relative to the part 5 about a pivot 7, so that the elements are cut off in succession with the part 6 lifting the lower elements into planar relationship with the upper elements.

We claim:

1. An arrangement of strips of fastening elements comprising adjacent groups of strips, each group having at least one strip, a band passing alternately above and below the groups, and adhesive means solely between said band and the strips connecting the strips directly to the band.

2. An arrangement as claimed in claim 1 wherein the strips are coplanar.

3. An arrangement as claimed in claim 2 wherein each strip includes a face and two sides perpendicular to the face, the band being positioned in a single layer intermediate said groups.

4. A method of arranging strips of fastening elements comprising arranging groups of said strips on opposite sides of a planar band in staggered relation, spacing the groups laterally by a distance substantially equal to the height of said elements, interleaving an adhesive in the interspace between the strips and planar band for locking together in unitary relationship and bringing the strips into coplanar alignment.

5. An arrangement of strips of fastening elements comprising adjacent groups of strips, each group having at least one strip, a band passing alternately above and below the groups, said band including base portions and side hinge portions, and adhesive means solely between said band and said strips connecting the strips directly to said band, said side hinge portions being removable from the sides of two adjacent groups to separate said adjacent groups while maintaining the fastening elements of said strips locked together.

References Cited in the file of this patent

UNITED STATES PATENTS

| | | |
|---|---|---|
| 653,152 | Roeber | July 3, 1900 |
| 1,523,392 | Briggs | Jan. 20, 1925 |
| 1,561,210 | Boaraem | Nov. 10, 1925 |
| 1,732,001 | Crofoot | Oct. 15, 1929 |
| 1,739,085 | Parker | Dec. 10, 1929 |
| 2,033,613 | Crosby | Mar. 10, 1936 |
| 2,137,467 | Vogel | Nov. 22, 1938 |
| 2,266,534 | Cavanagh | Dec. 16, 1941 |